UNITED STATES PATENT OFFICE.

BENJAMIN YOUNG SHARP, OF UVALDE, TEXAS.

PROCESS OF EXTRACTING WAX FROM THE CANDELILLA-PLANT.

1,018,589.      Specification of Letters Patent.    Patented Feb. 27, 1912.

No Drawing.     Application filed October 30, 1911. Serial No. 657,631.

*To all whom it may concern:*

Be it known that I, BENJAMIN YOUNG SHARP, a citizen of the United States, residing at Uvalde, in the county of Uvalde and State of Texas, have invented new and useful Improvements in Processes of Extracting Wax from the Candelilla-Plant, of which the following is a specification.

This invention relates to the process of extracting wax from the candelilla plant by means of gasolene, benzin or naphtha, and has for its object to secure a wax of light yellow color, instead of the dark green wax obtained by the processes now in use.

In extracting candelilla wax by means of a volatile mineral oil, a continuous flow of the oil passes from the "digester" containing the plant, to the evaporator, where sufficient heat is applied to evaporate the oil, which goes over into a condenser, and flows from there back into the digester. This leaves the wax which is drawn from the bottom of the evaporator.

The resulting wax of this process, is of dark green color. I boil the plant containing the wax, in the volatile mineral oil, in the presence of fullers' earth, for a sufficient length of time to extract the wax from the plant. I then adopt either of the following methods of procedure:

1st. I pass the entire fluid into a separate tank where it is allowed to stand till it settles and becomes clear. The clear liquid is then drawn off and passed into the evaporator where the oil is driven off by heat and recovered in the condenser, and the wax is drawn from the bottom of the evaporator.

2nd. Or the fluid is passed through a filter, from the digester directly to the evaporator where the process is continued as in the first instance.

The wax obtained by my process is of light yellow color, and has a greater commercial value than the dark green wax obtained by other processes of gasolene, benzin or naphtha extraction.

I claim:

The process of extracting candelilla wax from the candelilla plant, consisting in boiling the plant in gasolene, benzin or naphtha in the presence of fullers' earth and clarifying the liquid before evaporating the volatile oil to recover the wax, substantially as herein described.

BENJAMIN YOUNG SHARP.

Witnesses:
G. B. FENLEY,
LEE D. FLYNT.